United States Patent
Sadiq

(10) Patent No.: US 6,397,252 B1
(45) Date of Patent: May 28, 2002

(54) METHOD AND SYSTEM FOR LOAD BALANCING IN A DISTRIBUTED OBJECT SYSTEM

(75) Inventor: Waqar Sadiq, Rochester Hills, MI (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 08/995,115

(22) Filed: Dec. 19, 1997

(51) Int. Cl.$^7$ ................. G06F 15/173; G06F 15/177
(52) U.S. Cl. ..................... 709/226; 345/433
(58) Field of Search .............. 709/204, 18, 213, 709/201, 224, 168, 202, 314, 238, 105; 711/202; 379/265; 395/610, 133, 500; 364/551.01; 707/100, 10, 2, 8; 345/335, 349; 209/202, 328, 106, 226; 370/229; 382/305; 713/2; 702/62; 445/453

(56) References Cited

U.S. PATENT DOCUMENTS

| | | | | |
|---|---|---|---|---|
| 5,283,897 A | * | 2/1994 | Geogiadis et al. | 709/105 |
| 5,305,389 A | * | 4/1994 | Palmer | 382/305 |
| 5,307,490 A | * | 4/1994 | Davidson et al. | 709/328 |
| 5,430,850 A | * | 7/1995 | Papadopoulos et al. | 709/314 |
| 5,504,894 A | * | 4/1996 | Ferguson et al. | 707/2 |
| 5,572,674 A | * | 11/1996 | Ernst | 709/213 |
| 5,634,004 A | * | 5/1997 | Gopinath et al. | 709/201 |
| 5,692,193 A | * | 11/1997 | Jagannathan et al. | 709/106 |
| 5,720,018 A | * | 2/1998 | Muller et al. | 345/433 |
| 5,724,575 A | * | 3/1998 | Hoover et al. | 395/610 |
| 5,787,163 A | * | 7/1998 | Taylor et al. | 379/265 |
| 5,790,789 A | * | 8/1998 | Suarez | 709/202 |
| 5,794,005 A | * | 8/1998 | Steinman | 395/500 |
| 5,794,228 A | * | 8/1998 | French et al. | 707/2 |
| 5,796,393 A | * | 8/1998 | MacNaughton et al. | 345/329 |

(List continued on next page.)

OTHER PUBLICATIONS

Kale et al, CHARM++: A portable concurrent Object Oriented system based on C++, http://charm.cs.uiuc.edu/version2/papers/charmppOOPSLA93.www/paper.html, 1996.*
Joosen et al, On flexible support for mobile Objects. IEEE 1996.*
Lin et al. Load Balancing Technique for Parallel Search with Statistical Model, Jul. 1995.*
Nicol et al . Load Balancing of Complex Stochastic Tasks Using Stochastic Majorization, 1993.*
Kerscheberg et al data & information Architectures for Large–Scale Distributed Data Intensive Information System, 1996.*

Primary Examiner—Mark H. Rinehart
Assistant Examiner—Thong Vu
(74) Attorney, Agent, or Firm—Baker Botts LLP

(57) ABSTRACT

One aspect of the invention is a method for load balancing in a distributed object system running on a network comprising a plurality of computers (42, 44) including a first computer (44) wherein the computers (42, 44) are operable to access a plurality of shared objects in a distributed object system. The method comprises instructing an object comprising a part of an application process (50) running on the first computer (44) to record at least one performance statistic in response to a message directed to the object. The application process (50) comprises a multi-threaded process and includes a statistics thread (54). Periodically, at least one performance statistic is obtained using the statistics thread (54) and that performance statistic is sent to a local agent process (48) running on the first computer (44). The performance statistics are relayed to a workload service (46) running on a second computer (42) connected to the network. A new distributed object is instantiated in the memory of one of the plurality of computers (42, 44) based upon performance statistics maintained by the workload service (46).

23 Claims, 1 Drawing Sheet

U.S. PATENT DOCUMENTS

| | | | | |
|---|---|---|---|---|
| 5,796,633 A | * | 8/1998 | Burgess et al. | 702/187 |
| 5,802,282 A | * | 9/1998 | Hales, II et al. | 709/204 |
| 5,818,448 A | * | 10/1998 | Katiyar | 345/335 |
| 5,832,484 A | * | 11/1998 | Sankaran et al. | 707/8 |
| 5,848,243 A | * | 12/1998 | Kulkarni et al. | 709/224 |
| 5,860,137 A | * | 1/1999 | Raz et al. | 711/202 |
| 5,878,421 A | * | 3/1999 | Ferrel et al. | 707/100 |
| 5,881,311 A | * | 3/1999 | Woods | 709/105 |
| 5,884,035 A | * | 3/1999 | Butman et al. | 709/18 |
| 5,889,520 A | * | 3/1999 | Glasser | 345/349 |
| 5,890,156 A | * | 3/1999 | Rekieta et al. | 707/10 |
| 5,892,946 A | * | 4/1999 | Woster et al. | 709/168 |
| 5,898,681 A | * | 4/1999 | Dutta | 370/229 |
| 5,956,716 A | * | 9/1999 | Kenner et al. | 707/10 |
| 5,958,012 A | * | 9/1999 | Battat et al. | 709/224 |
| 5,969,967 A | * | 10/1999 | Aahlad et al. | 364/131 |
| 5,993,038 A | * | 11/1999 | Sitbon et al. | 709/202 |
| 6,038,664 A | * | 3/2000 | Schumacher et al. | 713/2 |
| 6,055,433 A | * | 4/2000 | Yuan et al. | 455/153 |
| 6,141,720 A | * | 10/2000 | Jeffords et al. | 710/200 |
| 6,167,427 A | * | 12/2000 | Rabinovich et al. | 709/201 |
| 6,178,449 B1 | * | 1/2001 | Forman et al. | 709/224 |

* cited by examiner

METHOD AND SYSTEM FOR LOAD BALANCING IN A DISTRIBUTED OBJECT SYSTEM

TECHNICAL FIELD OF THE INVENTION

This invention relates generally to object-oriented programming and more particularly to a method and system for load balancing in a distributed object system.

BACKGROUND OF THE INVENTION

When large-scale distributed object systems are built, scalability and performance are major concerns. Scalability refers to the ability of a system to scale up to support a larger number of users, a larger workload, a larger number of transactions, and/or a larger number of services. In other words, scalability refers to the ability of a system to easily expand to perform more work. A system with good scalability allows one to introduce more resources as needed to scale the system to support the additional workload without making significant changes to the remainder of the system.

In typical distributed system environments, the load on the system changes, sometimes on a monthly basis and even on a daily basis. A flexible system should ideally make efficient use of all resources in the system to balance the load across the network and achieve high performance.

Software developers have begun considering the implementation of large distributed object systems. In such systems, it may be desirable for the systems manager to balance the workload of various computer processes across the network. Accordingly, a need has arisen for a scalable distributed object system that attains high performance by efficiently distributing the workload across a network.

SUMMARY OF THE INVENTION

The invention provides a method and system for load balancing in a distributed object system that facilitates the scalability and efficient performance of that system. One aspect of the invention is a method for load balancing in a distributed object system running on a network comprising a plurality of computers including a first computer wherein the computers are operable to access a plurality of shared objects in a distributed object system. The method comprises instructing an object comprising a part of an application process running on the first computer to record at least one performance statistic in response to a message directed to the object. The application process comprises a multi-threaded process including a statistics thread. The at least one performance statistic may be periodically obtained using the statistics thread and sent to a local agent process running on the first computer. The performance statistic is related to a workload service running on a second computer connected to the network. A new distributed object is instantiated in the memory of one of the plurality of computers based upon performance statistics maintained by the workload service.

The invention has several important technical advantages. By using a workload service to determine where new objects are instantiated, the invention allows efficient use of all computer resources in a distributed object system. The disclosed system is highly scalable. Because the invention takes into account the performance of the system in determining where to instantiate new objects, the system makes efficient use of resources to achieve higher throughput. The architecture of the system allows each business object (or application object) to maintain its own statistics, thus allowing the workload service and local agents to operate smoothly without regard to how many application processes are providing the workload service and local agent with statistics.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

Figure 1:
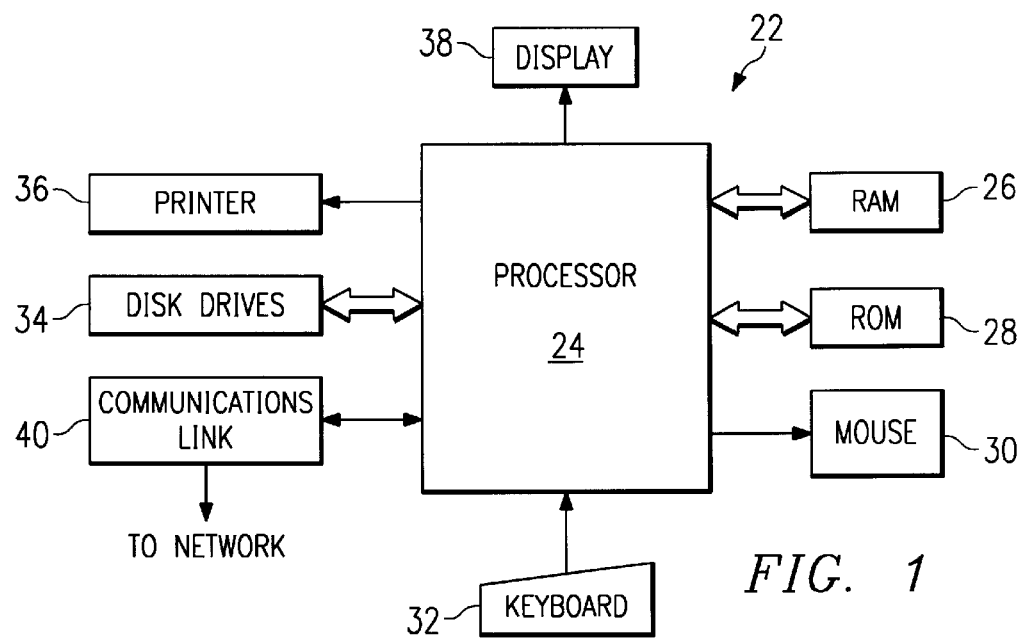
FIG. 1 illustrates an exemplary general purpose computer that may be used to implement the present invention.
Figure 2:
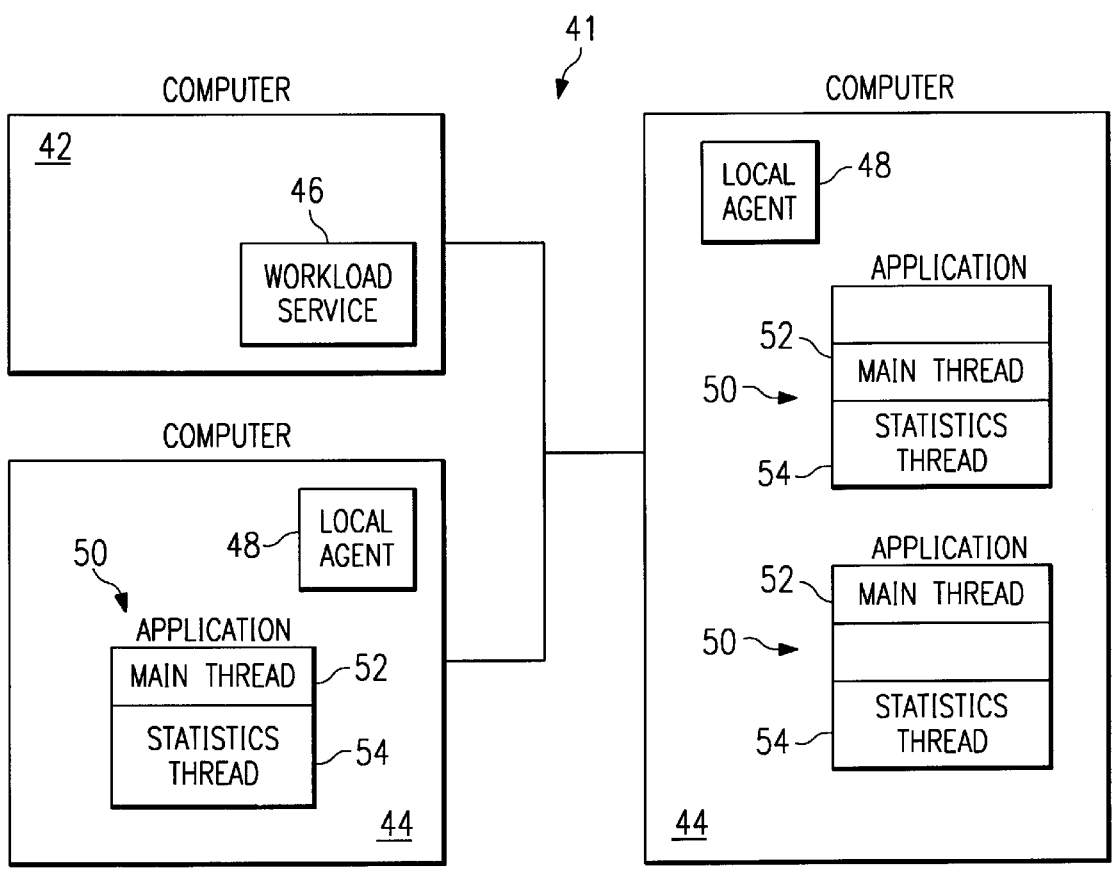
FIG. 2 illustrates an exemplary distributed object system constructed in accordance with the invention.

The preferred embodiment of the present invention and its advantages are best understood by referring to FIGS. 1–2 of the drawings, like numerals being used for like and corresponding parts of the various drawings.

FIG. 1 illustrates a general purpose computer 22 that may be used in a distributed object system created in accordance with the invention. The general purpose computer 22 may be used to execute distributed application processes and/or distributed system services in accordance with the invention. General purpose computer 22 may be adapted to execute any of the well-known OS2, UNIX, MAC-OS and WINDOWS operating systems or other operating systems. General purpose computer 22 comprises processor 24, random access memory (RAM) 26, read only memory (ROM) 28, mouse 30, keyboard 32 and input/output devices such as disk drives 34, printer 36, display 38 and communications link 40. The present invention includes programs that may be stored in RAM 26, ROM 28 or disk drives 34 and may be executed by processor 24. Communications link 40 connects to a computer network but could be connected to a telephone line, an antenna, a gateway or any other type of communications link. Disk drives 34 may include a variety of types of storage media such as, for example, floppy disk drives, hard disk drives, CD-ROM drives or magnetic tape drives. Although this embodiment employs a plurality of disk drives 34, a single disk drive 34 could be used without departing from the scope of the invention. FIG. 1 only provides one example of a computer that may be used with the invention. The invention could be used on computers other than general purpose computers, as well as on general purpose computers without conventional operating systems.

FIG. 2 illustrates an example of a distributed object load balancing system 41 constructed in accordance with the invention. Distributed object load balancing system 41 comprises two or more computers 42, 44 networked together. Each of the computers 42, 44 may be similar in structure and operation to general purpose computer 22 illustrated in FIG. 1. Other types of computers could also be used without departing from the scope of the invention. Mainframe computers and mini-computers as well as personal computers (also known as microcomputers) may be useful for implementing distributed object systems in accordance with the invention. Each of the computers 42, 44 may be networked to one another in any way that multiple computers may be connected.

Distributed object load balancing system 41 comprises computer 42 with workload service software 46 running on it. Workload service 46 is operable to receive performance statistics for various application processes running in the distributed object system. The term, distributed object system, as used in this application is meant to refer broadly to any system that uses distributed objects. Workload service 46 may then be used to determine which of the plurality of computers 42, 44 in the distributed object system should be used to create a new object in the memory of one of the computers 42, 44 where the new object comprises a part of the distributed object system. Although workload service 46 could be designed with many different goals in mind, workload service 46 preferably causes objects in a distributed object system to be created in the memory of one of the computers 42, 44 in such a way as to balance the workload of each of the computers 42, 44. The invention thus allows a distributed object system constructed in accordance with the invention to adapt to varying traffic patterns in the system and make efficient use of various available resources.

The workload service 46 collects detailed statistical information about what different objects are active in different processes, the computer 42, 44 on which the objects reside, what methods have been invoked on them, how many times those methods have been invoked, and how much time has been spent in executing the methods. In one embodiment, the amount of time spent for a given method is measured in terms of CPU time but could be measured by other types of time measurements. The present invention allows statistics gathering for the aggregate of all objects of a particular type. For example, a bank attempting to keep track of customer accounts in a distributed object system may have a customer object. Suppose that the bank has only three customers A, B & C. Workload service 46 may maintain the statistics for objects A, B and C, separately, and may also maintain cumulative numbers for all customers. Thus, workload service 46 may maintain the above-described statistics for all customer objects cumulatively as well as other statistics on a cumulative basis. Average statistics for all instances of a given object class might also be maintained by workload service 46. Thus, when workload service 46 attempts to determine which computer 42, 44 should contain a distributed object in its memory, the workload service 46 may take into account not only the present workload of the computers 42, 44 in the distributed object system, but may also make the decision based upon a prediction of the resources that will be consumed by the new object due to the average workload that objects of that particular object class have previously imposed on computers 42, 44. Note that more statistics or less statistics could be collected by workload service 46 without departing from the scope of the invention.

Because the application processes 50 running on various computers 42, 44 may be performing critical tasks, the invention seeks to perform valuable statistics gathering without interfering with the operation of these application processes 50. Note that an actual application may comprise many application processes 50. The invention achieves this goal by providing a statistics thread 54 within each application process 50 to be responsible for gathering statistics. Statistics thread 54 may be transparent to an application developer who is developing a distributed object system application process 50. A distributed object framework may be provided to an application developer such that statistics thread 54 is automatically incorporated into an application process 50 when the application developer chooses to use that framework. Statistics thread 54 avoids interfering with the function of application process 50 by running asynchronously and avoiding interruption of the actual business tasks being conducted by application process 50. In this example, application process 50 is a multi-threaded application process comprising a statistics thread 54 and a main thread 52.

Main thread 52 and any other application threads may be used to perform whatever task for which application process 50 is designed to perform. Additional threads could be included without departing from the scope of the invention.

In this embodiment, an interceptor thread (not explicitly shown) for each application process 50 intercepts messages intended for objects of application process 50. The interceptor thread is responsible for informing an object to update its performance statistics upon completion of a given operation. Thus, application process 50 instructs its own objects to gather performance statistics regarding themselves. Each object has access to a statistics data structure in memory of the computer 42, 44 on which it is running. The statistics data structure for a given application process 50 resides in the memory space for that application process 50. When an object completes an operation, it updates the statistics data structure with the statistics described above in connection with workload service 46. Additional statistics could be recorded or some of the above statistics excluded without departing from the scope of the invention. One option for avoiding interference with the operation of application process 50 is to only maintain performance statistics for messages received by application process 50 that originated outside of the application process 50.

Statistics thread 54 may be configured by the developer of application process 50 to periodically wake up, gather the statistics on objects currently residing in the memory of the computer 42, 44 on which the application process 50 is executing, and send these statistics to workload service 46 through local agent 48. Statistics thread 54 may be programmed to send either an empty message or no message at all to local agent 48 if no new statistics have been generated since the last time statistics thread 54 woke up. Such an action may be considered to be part of the process of waking up and forwarding of statistics. Thus, when this application refers to periodically waking up and obtaining performance statistics, that action encompasses obtaining no information during some of the periods. Eventually, the statistics thread will obtain a performance statistic during one of the periodic wake up times. The statistics thread gathers statistics on objects residing in the memory space of the application process 50 with which it is associated. In this embodiment, statistics thread 54 wakes up periodically, accesses the data structure containing the statistical data and sends the statistical information to local agent 48. Statistics thread 54 then goes to sleep. The time between the periods of statistics gathering by statistics gathering thread 54 may be adjustable either during development of application process 50 or by a system administrator during use of application process 50.

Local agent 48 receives performance statistics from various statistics threads 54 and relays those statistics to workload service 46. The invention thus avoids interference with application process 50. In a distributed object network environment, no assumptions can be made about the speed of the network and the availability of various services on the network. In addition, statistics data is eventually reported from many different local agents 48 to a central workload service 46. Because the workload service 46 may be busy receiving data from several local agents 48, it may delay the reporting of data from other local agents 48. Because local agents 48 receive their data from statistics threads 48 resident on the same computer 42, 44, local agent 48 may receive the statistical data immediately from the statistics thread 48, freeing up the application process 50 to continue performing its function. Local agent 48 may save the statistics data on a persistent storage medium and relay it to workload service 46 when the network is not busy or when workload service 46 is ready to receive the data. In an alternative embodiment, statistics thread 48 could perform the functions of local agent 48 such as forwarding statistics to the workload service.

Although the operation of distributed object load balancing system 41 has been described above, it will now be briefly summarized for an example embodiment. Each application process 50 maintains performance statistics regarding its objects resident in memory of the computer 42, 44 that is running the application process 50. Periodically, statistics thread 54 wakes up and relays those statistics to local agent 48. Local agent 48 relays the performance statistics to workload service 46. When it is desired to instantiate a new application object, the decision of which application process 50 is to instantiate and contain the new application object is based upon performance statistics maintained by workload service 46. Any suitable formula or algorithm may be used for this determination.

Although the present invention has been described in detail, it should be understood that various changes, substitutions, and alterations can be made hereto without departing from the spirit and scope of the invention as defined by the appended claims.

What is claimed is:

1. A distributed object load balancing system for use with a network comprising a plurality of computers including a first computer, wherein the computers are operable to access a plurality of shared objects in a distributed object system, the load balancing system comprising:
   a workload service running on the first computer;
   at least one application process running on at least one of the plurality of computers different from the first computer, wherein the at least one application process is a multi-threaded process comprising a statistics thread;
   wherein the application process is operable to instruct an object comprising a part of the application process to record at least one performance statistic;
   wherein the statistics thread is operable to wake up periodically and obtain the at least one performance statistic, the statistics thread further operable to cause the at least one performance statistic to be sent to the workload service;
   wherein a new shared object comprising part of the distributed object system is created in the memory of one of the plurality of computers based upon performance statistics maintained by the workload service; and
   wherein the one of the plurality of computers for the new shared object is selected based upon a prediction of resources that will be consumed by the new shared object.

2. The distributed object load balancing system of claim 1, wherein the application process instructs an object comprising a part of the application process to record at least one performance statistic using an interceptor thread that generates the instruction to the object at the conclusion of the processing of a message sent to that object.

3. The distributed object load balancing system of claim 1, wherein performance statistics are only maintained for messages to objects comprising part of the application process that originated outside of the application process.

4. The distributed object load balancing system of claim 1, wherein each object in an application process stores its statistics in a statistics data structure.

5. The distributed object load balancing system of claim 4, wherein the statistics thread traverses the statistics data structure to obtain statistics data and causes the statistics data to be sent to the workload service.

6. The distributed object load balancing system of claim 1, further comprising:
   a local agent running on one of the plurality of computers;
   wherein that statistics thread is operable to cause the at least one performance statistic to be sent to the workload service by sending the at least one performance statistic to the local agent; and
   wherein the local agent is operable to receive performance statistics from one or more statistics threads and relay those performance statistics to the workload service.

7. The distributed object load balancing system of claim 6, wherein the local agent receives performance statistics from multiple statistics threads, each statistics thread associated with an application process running on the same computer with the local agent.

8. The distributed object load balancing system of claim 1, wherein the prediction is based on an average workload based on the at least one performance statistic and associated with an object class associated with the new shared object.

9. A distributed object load balancing system for use with a network comprising a plurality of computers including a first computer, wherein the computers are operable to access a plurality of shared objects in a distributed object system, the load balancing system comprising:
   a workload service running on the first computer;
   at least one application process running on at least one of the plurality of computers different from the first computer, wherein the at least one application process is a multi-threaded process comprising a statistics thread;
   wherein the application process is operable to instruct an object comprising a part of the application process to record at least one performance statistic;
   wherein the statistics thread is operable to wake up periodically and obtain the at least one performance statistic, the statistics thread further operable to cause the at least one performance statistic to be sent to the workload service;
   wherein a new shared object comprising part of the distributed object system is created in the memory of one of the plurality of computers based upon performance statistics maintained by the workload service; and
   wherein the at least one performance statistic comprises a statistic selected from the group consisting of the number of objects active for a given object class, the time spent in processing a message to an object, the computer on which each object resides, what methods have been invoked on each object, a cumulative measure of the time spent in processing a type of message to all instances of a given object class, a cumulative measure of the number of times a particular method has been invoked for all instances of a given object class, and the number of times a method has been invoked for a given period of time.

10. A method for load balancing in a distributed object system running on a network comprising a plurality of computers including a first computer, wherein the computers are operable to access a plurality of shared objects in a distributed object system, the method comprising:
   instructing an object comprising a part of an application process running on the first computer to record at least one performance statistic in response to a message directed to the object, the application process comprising a multi-threaded process and including a statistics thread;

periodically obtaining the at least one performance statistic using the statistics thread;

relaying the at least one performance statistic to a workload service running on a second computer connected to the network;

instantiating a new distributed object comprising part of the distributed object system in the memory of one of the plurality of computers based upon performance statistics maintained by the workload service; and selecting the one of the plurality of computers for the new shared object based upon a prediction of resources that will be consumed by the new shared object.

11. The method of claim 10, further comprising:

instructing an object comprising a part of the application process to record the at least one performance statistic using an interceptor thread that generates the instruction to the object at the conclusion of the processing of a message sent to that object.

12. The method of claim 9, wherein performance statistics are only maintained for messages to objects comprising part of the application process that originated outside of the application process.

13. The method of claim 9, wherein each object in an application process stores its statistics in a statistics data structure.

14. The method of claim 12, further comprising:

traversing the statistics data structure to obtain statistics data and causing the statistics data to be sent to the workload service using the statistics thread.

15. The method of claim 10, wherein the periodicity of obtaining the at least one performance statistic is configurable for each application process.

16. The method of claim 10, wherein the statistics thread relays the at least one performance statistic to the workload service by sending the statistic to a local agent process running on the first computer, the local agent process operable to relay that at least one performance statistic to the workload service.

17. The method of claim 16, wherein the local agent receives performance statistics from multiple statistics threads, each statistics thread associated with an application process running on the same computer with the local agent.

18. The method of claim 17, wherein each object in an application process stores its statistics in a statistics data structure.

19. The method of claim 18, further comprising:

traversing the statistics data structure to obtain statistics data and sending the statistics data to the local agent using the statistics thread.

20. The method of claim 17, wherein the periodicity of obtaining the at least one performance statistic is configurable for each application process.

21. The method of claim 10 and further comprising determining an average workload associated an object class and based on the at least one performance statistic.

22. The method of claim 21, wherein instantiating the new shared object comprises:

predicting the resources that will be consumed by the new shared object based on the average workload; and selecting the one of the plurality of computers for the new shared object based on the prediction.

23. A method for load balancing in a distributed object system running on a network comprising a plurality of computers including a first computer, wherein the computers are operable to access a plurality of shared objects in a distributed object system, the method comprising:

instructing an object comprising a part of an application process running on the first computer to record at least one performance statistic in response to a message directed to the object, the application process comprising a multi-threaded process and including a statistics thread;

periodically obtaining the at least one performance statistic using the statistics thread;

relaying the at least one performance statistic to a workload service running on a second computer connected to the network; and instantiating a new distributed object comprising part of the distributed object system in the memory of one of the plurality of computers based upon performance statistics maintained by the workload service; and wherein the at least one performance statistic comprises a statistic selected from the group consisting of the number of objects active for a given object class, the time spent in processing a message to an object, the computer on which each object resides, what methods have been invoked on each object, a cumulative measure of the time spent in processing a type of message to all instances of a given object class, a cumulative measure of the number of times a particular method has been invoked for all instances of a given object class, and the number of times a method has been invoked for a given period of time.

* * * * *